(12) United States Patent
Bansal et al.

(10) Patent No.: US 11,090,589 B2
(45) Date of Patent: Aug. 17, 2021

(54) STRETCHABLE LAMINATED FILTER MATERIAL AND PROTECTIVE ARTICLE

(71) Applicants: Vishal Bansal, Lee's Summit, MO (US); Leo J. Crotty, Jr., Providence, RI (US); Christopher D. Ferraro, Leawood, KS (US); Yit-Hong Tee, Lee's Summit, MO (US)

(72) Inventors: Vishal Bansal, Lee's Summit, MO (US); Leo J. Crotty, Jr., Providence, RI (US); Christopher D. Ferraro, Leawood, KS (US); Yit-Hong Tee, Lee's Summit, MO (US)

(*) Notice: Subject to any disclaimer, the term of this patent is extended or adjusted under 35 U.S.C. 154(b) by 1130 days.

(21) Appl. No.: 15/435,845

(22) Filed: Feb. 17, 2017

(65) Prior Publication Data

US 2017/0239601 A1    Aug. 24, 2017

Related U.S. Application Data

(60) Provisional application No. 62/297,656, filed on Feb. 19, 2016.

(51) Int. Cl.
*B01D 39/16* (2006.01)
*A62B 17/04* (2006.01)
*A62B 23/02* (2006.01)
*B01D 39/08* (2006.01)
(Continued)

(52) U.S. Cl.
CPC .......... *B01D 39/1623* (2013.01); *A62B 17/04* (2013.01); *A62B 23/02* (2013.01); *B01D 39/083* (2013.01); *B01D 39/18* (2013.01); *A62B 18/025* (2013.01); *B01D 2239/0421* (2013.01); *B01D 2239/0428* (2013.01); *B01D 2239/0457* (2013.01); *B01D 2239/065* (2013.01); *B01D 2239/0627* (2013.01); *B01D 2239/10* (2013.01);
(Continued)

(58) Field of Classification Search
CPC .. B01D 39/1623; B01D 39/18; B01D 46/546; B01D 2239/025; B01D 2239/065; B01D 2239/1233; B01D 2239/1258; B01D 2239/1291; A62B 17/00; A62B 17/04; A62B 23/02; D04H 13/00
See application file for complete search history.

(56) References Cited

U.S. PATENT DOCUMENTS

| | | |
|---|---|---|
| 5,740,551 A | 4/1998 | Walker |
| 6,422,396 B1 | 7/2002 | Li et al. |
| 6,716,778 B1 | 4/2004 | Hottner |

(Continued)

FOREIGN PATENT DOCUMENTS

| | | |
|---|---|---|
| JP | 2014-114521 A | 6/2014 |
| WO | WO 2008/109116 | 9/2008 |
| WO | WO 2015/016449 A1 | 5/2015 |

OTHER PUBLICATIONS

European Patent Office, Extended European Search Report, dated May 18, 2014, 7 pages.

*Primary Examiner* — Jason M Greene
(74) *Attorney, Agent, or Firm* — Bourque & Associates

(57) ABSTRACT

An improved stretchable filtration fabric laminate is provided. The laminate includes a first fabric layer and a nanofiber layer. The laminate may be stretched without damaging the laminate. The laminate is thus suitable for incorporation into wearable protective garments, such as protective hoods, balaclavas, scarves, etc. that provide both protection and air filtration to the wearer.

21 Claims, 2 Drawing Sheets

(51) Int. Cl.
  *B01D 39/18* (2006.01)
  *A62B 18/02* (2006.01)
(52) U.S. Cl.
  CPC ............... *B01D 2239/1233* (2013.01); *B01D 2239/1258* (2013.01); *B01D 2239/1291* (2013.01)

(56) References Cited

U.S. PATENT DOCUMENTS

| | | |
|---|---|---|
| 8,647,540 B2 | 2/2014 | Peno et al. |
| 10,569,109 B2 | 2/2020 | Crotty et al. |
| 2002/0096246 A1* | 7/2002 | Sennet .................. D04H 13/00 156/167 |
| 2003/0106294 A1 | 6/2003 | Chung et al. |
| 2004/0116022 A1 | 6/2004 | Langley et al. |
| 2004/0116025 A1 | 6/2004 | Gogins et al. |
| 2005/0133035 A1 | 6/2005 | Yahiaoui et al. |
| 2008/0096001 A1 | 4/2008 | Emden |
| 2009/0126333 A1 | 5/2009 | Green et al. |
| 2009/0127747 A1 | 5/2009 | Green et al. |
| 2009/0199717 A1 | 8/2009 | Green et al. |
| 2009/0266048 A1 | 10/2009 | Schwarz |
| 2010/0279086 A1 | 11/2010 | Park et al. |
| 2010/0304108 A1* | 12/2010 | Doshi .................. D04H 1/4358 428/219 |
| 2010/0319113 A1 | 12/2010 | Rock et al. |
| 2011/0119815 A1 | 5/2011 | Paulson et al. |
| 2011/0171458 A1 | 7/2011 | Burger et al. |
| 2011/0262699 A1 | 10/2011 | Yializis |
| 2012/0141719 A1 | 6/2012 | Payne et al. |
| 2013/0183490 A1 | 7/2013 | Hsueh et al. |
| 2013/0192344 A1 | 8/2013 | Bryan et al. |
| 2013/0224467 A1 | 8/2013 | Hirao et al. |
| 2013/0327218 A1 | 12/2013 | Izzi et al. |
| 2014/0120322 A1* | 5/2014 | Fu ...................... B01D 39/1623 428/176 |
| 2014/0137569 A1 | 5/2014 | Parish et al. |
| 2016/0175748 A1* | 6/2016 | Park ...................... B05B 5/0255 55/524 |
| 2016/0213960 A1 | 7/2016 | Crotty et al. |
| 2016/0250575 A1* | 9/2016 | Park ...................... B01D 39/1623 55/486 |
| 2019/0234013 A1 | 8/2019 | Xing et al. |

* cited by examiner

STRETCHABLE LAMINATED FILTER MATERIAL AND PROTECTIVE ARTICLE

CROSS-REFERENCE TO RELATED PATENT APPLICATION

This patent application claims the benefit of U.S. Provisional Patent Application No. 62/297,656, filed Feb. 19, 2016, the entire teachings and disclosure of which are incorporated herein by reference thereto.

FIELD OF THE INVENTION

This invention generally relates to a stretchable laminated filtration fabric. The stretchable laminated filtration fabric is suitable for use in protective head coverings.

BACKGROUND OF THE INVENTION

Laminated fabric materials incorporating a filtration material are known. For example, a laminated fabric may include a membrane capable of filtering fine particulates, such as an expanded polytetrafluoroethylene (ePTFE) membrane, to provide filtration. However, many materials suitable for fine particle filtration lack properties that would be desirable for garment applications.

In a particular application, military personnel employ durable head gear (e.g., a hood, balaclava, or scarf) for head and neck protection. Typically, such head gear may extend over a user's head, including the mouth and nose area, to provide protection from various hazards. For example, U.S. soldiers use protective hoods in desert and cold environments that may be found in Afghanistan, Iraq, etc. Such hoods or balaclavas are typically designed to provide protection from both environmental hazards (e.g., wind, cold, sun) and hostile actions (fire, blast, and other thermal damage). Currently-available hoods or balaclavas used are usually manufactured from common stretchable fabrics with some flame retardant properties. These products do not offer any protection against inhalation of fine sand, aerosolized bacteria, burn pit fumes, smoke, etc. To provide an improved protective hood, improved materials are required.

The invention provides such an improved material and articles of protective clothing formed therefrom. These and other advantages of the invention, as well as additional inventive features, will be apparent from the description of the invention provided herein.

BRIEF SUMMARY OF THE INVENTION

In one aspect, the invention provides a stretchable fabric filter laminate. The laminate includes a nanofiber filtration layer having first side and a second side, and a first fabric layer laminated to the first side.

In one additional feature, the laminate also includes a second fabric layer laminated to the second side.

In another feature, the nanofiber filtration layer has a basis weight between about 5 to about 50 grams per $m^2$. In a further feature, the nanofiber filtration layer has a basis weight between about 15 to 30 about grams per $m^2$.

In another feature, the nanofiber film is between about 2 microns to about 50 microns in thickness.

In another feature, the nanofiber filtration layer includes fibers having a diameter of between about 100 nm to about 1200 nm. In a further feature, the nanofiber filtration layer includes fibers having a diameter of between about 500 nm to about 1000 nm.

In another feature, the nanofiber filtration layer has a particle removal efficiency of at least 75% for particles sized 0.3 micron and greater. In a further feature, the nanofiber filtration layer has a particle removal efficiency of at least 90% for particles sized 0.3 micron and greater.

In another feature, the nanofiber filtration layer includes a flame retardant, elastomeric polymer. The polymer is selected from the group consisting of thermoplastic polyurethane (TPU) with a flame retardant additive; polyvinylidene difluoride (PVDF); nylon with a flame retardant additive; polytetrafluoroethylene (PTFE); and elastomeric block copolymers.

In another feature, the laminate is reversibly stretchable by at least ten percent. In a further feature, the laminate is reversibly stretchable by at least thirty percent.

In another feature, the laminate has a MVTR of at least 15,000 $g/m^2/day$. In a further feature, the laminate has a MVTR of at least 20,000 $g/m^2/day$.

In another feature, the first fabric layer is selected from the group consisting of woven fabrics, non-woven fabrics, and knit fabrics. The first fabric layer may include a flame retardant material selected from the group consisting of m-aramid, oxidized polyacrylonitrile (OPAN), liquid crystal thermoplastic polymers, polytetrafluoroethylene (PTFE), flame retardant polyester, and flame-retardant treated cotton.

In another aspect, the invention provides a garment configured to be worn on the head of a user. The garment includes a facial portion configured to cover the face of the user. The facial portion comprises a stretchable fabric filter laminate.

In one feature, the garment is a protective hood configured to cover at least 80 percent of the skin of the user's head and neck area when worn.

In yet another aspect, the invention provides a method. The method includes the step of providing a garment with a nanofiber filtration layer. The nanofiber filtration layer has a first side and a second side. The garment also includes a first fabric layer laminated to the first side of the nanofiber filtration layer. The method also includes the steps of positioning the garment on the head of a wearer, and inhaling air through the garment to provide a filtered inhalation air flow to the wearer.

In one feature of the method, the nanofiber filtration layer includes fibers having a diameter of between about 100 nm to 1200 nm. The nanofiber filtration layer also has an air permeability of at least 30 $ft^3/min/ft^2$ at 125 Pa, a porosity of at least 80 percent, and an MVTR of at least 30,000 g/m2/day.

It is another aspect of the present invention that a person is able to use the garment to filter air during breathing by at least partially covering ones mouth or nose with the garment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Military personnel currently employ protective hoods in a many situations presenting potentially-hazardous conditions. To provide suitable protection against fire and thermal injuries, a protective hood known as the Lightweight Protective Hood (LPH) is provided to U.S. military personnel. The LPH is a simple hood or balaclava is formed from a stretchable fabric material with flame retardant properties. However, the LPH does not provide any significant protection from inhalation hazards, for example fine sand and dust, aerosolized bacteria, burn pit fumes, smoke particulates, etc.

To provide such protection from inhalation hazards in a protective hood, a suitable material typically meets some or preferably all of the following:

1. High air permeability (to enable comfortable breathing)
2. High Moisture vapor transmission rate (for user comfort)
3. Good filtration efficiency (to provide inhalation protection)
4. Easy dust release (to prevent plugging of the material with dust)
5. Wash durability up to at least 25 laundry cycles (to be consistent with requirements of individual soldier clothing)
6. Flame retardant (to protect face and neck from burns)
7. Soft, noise-free, and comfortable against the user skin
8. Stretchable (to enable good fit around face)

Many currently-available materials fail to meet at least some of the above properties. For example, ePTFE is a commonly used durable filtration material. However, ePTFE membranes fail to provide sufficient air permeability, and are insufficiently stretchable to enable a good fit around the user's face. In another example, known laminates including nanofiber films do not release dust, are insufficiently durable when subjected to repeated wash cycles, and are often not flame retardant.

An embodiment of the present invention provides a stretchable, multi-layer filtration laminate suitable for use in protective garments, as described in further detail below.

Figure 1:
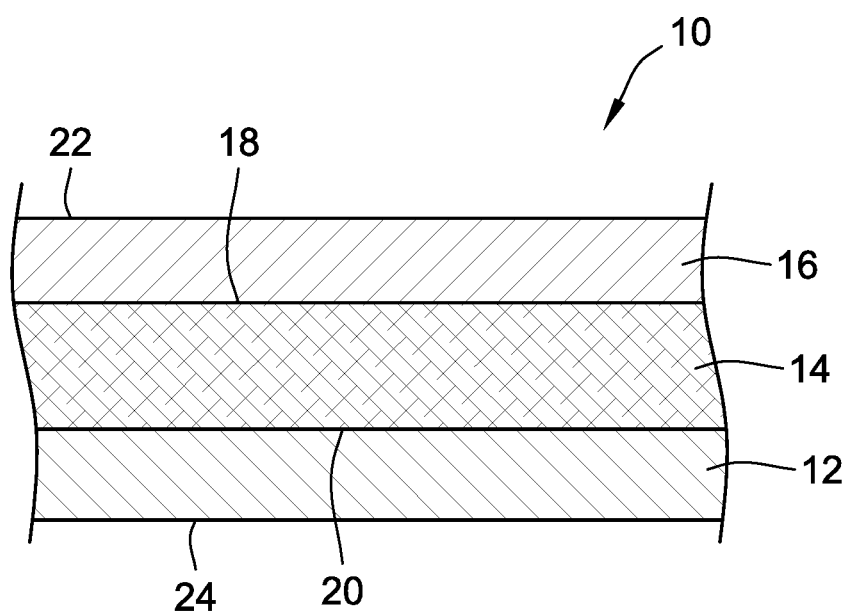
FIG. 1 is a cross-sectional view of a multi-layer laminate of the present invention.

As shown in FIG. 1, a multi-layer laminated material 10 is provided. Laminate 10 includes a first fabric layer 12 and a nanofiber film 14. In preferred embodiments, laminate 10 further includes a second fabric layer 16. However, laminate 10 may be provided with fabric layer on only one side of nanofiber layer 14.

Nanofiber film 14 in generally planar and includes a first side 18 and an opposed second side 20. In a preferred embodiment, nanofiber film 14 is produced by a centrifugal spinning process, such as disclosed in U.S. Pat. No. 8,647,540, the entire content of which is hereby incorporated by reference in its entirety. Centrifugal spinning is most preferred and has been found to provide a nanofiber film having sufficient coverage, loft, and thickness for proper airflow and permeability suitable for a person to breathe when worn, without creating an overly restrictive film and is suitable for the correct size of diameters various polymeric materials particularly suited for such a garment. Centrifugal spinning does not expand the fibers under the power of a voltage differential, but merely uses centrifugal force to draw fibers down to size.

In other embodiments, a nanofiber film may be produced by an electrospinning process, such as described in U.S. Pat. Pub. Nos. 2009/0127747, 2009/0126333, and 2009/0199717, the entire contents of which are hereby incorporated by reference in their entirety. In still other embodiments, a nanofiber film may be produced by an electro-blowing or melt-blowing process. However, in such other embodiments, performance of some properties may be sacrificed.

In typical embodiments, nanofiber film 14 has a thickness of between about 2 microns and about 50 microns, as measured between first side 18 and second side 20. In more preferred embodiments, the thickness of nanofiber film 14 is between about 6 microns and about 40 microns. The thickness of nanofiber film 14 is greater than conventional nanofiber layers typically employed in filtration laminates.

In preferred embodiments, nanofiber film 14 also has a porosity of at least 80 percent. In more preferred embodiments, nanofiber layer 14 has a porosity of at least 85 percent.

In preferred embodiments, nanofiber film 14 also has an air permeability of at least 30 ft$^3$/min/ft$^2$ at 125 Pa, as measured by ASTM D737. In a more preferred embodiment, nanofiber film 14 has an air permeability of at least 40 ft$^3$/min/ft$^2$ at 125 Pa.

In preferred embodiments, nanofiber film 14 also has a filtration efficiency of at least 75% at a particle size of 0.3 micron, as measured by British Standard BS EN1822. In a more preferred embodiment, nanofiber film 14 has a filtration efficiency of at least 90% at a particle size of 0.3 micron. In a still more preferred embodiment, nanofiber film 14 has a filtration efficiency of at least 95% at a particle size of 0.3 micron.

In preferred embodiments, nanofiber film 14 also a Moisture Vapor Transmission Rating (MVTR) of at least 20,000 g/m$^2$/day, as measured by ISO 15496 (inverted cup method). In more preferred embodiments, nanofiber film 14 has a MVTR of at least 30,000 g/m$^2$/day or more. In most preferred embodiments, nanofiber film 14 has a MVTR of at least 40,000 g/m$^2$/day or more.

Surprisingly, an increased thickness of the nanofiber film 14 relative to nanofiber films present in prior art laminates has been found to improve the resistance of nanofiber film 14 of laminated material 10 to degradation when subjected to repeated wash cycles typical of a garment, while retaining a high air permeability (at least 30 ft$^3$/min/ft$^2$ at 125 Pa, and preferably 40 ft$^3$/min/ft$^2$ at 125 Pa), porosity (at least 80 percent, and preferably 85 percent), MVTR (at least 30,000 g/m$^2$/day, and preferably 40,000 g/m$^2$/day), and filtration efficiency (at least 75% for particles 0.3 micron and larger). In a preferred embodiment of the present invention, nanofiber film 14 retains an air permeability of at least 30 ft$^3$/min/ft$^2$ at 125 Pa, a porosity of at least 80 percent, an MVTR of at least 30,000 g/m$^2$/day, and a filtration efficiency of at least 75% for particles 0.3 micron and larger after 25 machine wash cycles in a conventional top-load washer (approximately 20 minutes agitation, 3 minutes spin drying, and 5 minutes rinse).

As used herein "nanofiber" generally means a fiber having either an average diameter of less than 2 micron, and "nanofiber layer" means that the fibers collectively in that layer have a median diameter of less than 2 micron. In typical embodiments, individual nanofibers of nanofiber film 14 have a diameter between about 100 nm and about 1200 nm. In more preferred embodiments, nanofibers of nanofiber film 14 have a diameter between about 500 nm to about 1000 nm. In another embodiment, nanofibers of nanofiber film 14 have a diameter between about 400 nm to about 600 nm. The thickness of the individual nanofibers of nanofiber layer 14 also improves the durability of nanofiber film 14 when subjected to repeated wash cycles, while retaining high air permeability, porosity, and MVTR, as described above.

In preferred embodiments, nanofiber film 14 is formed from flame retardant, elastomeric polymers. Suitable polymeric materials include thermoplastic polyurethane (TPU) with a flame retardant additive; polyvinylidene difluoride (PVDF); nylon with a flame retardant additive; polytetrafluoroethylene (PTFE); and elastomeric block copolymers such as thermoplastic elastomer polyesters (for example, HYTREL® thermoplastic elastomer polyesters, sold by E. I. du Pont de Nemours and Co.) and thermoplastic elastomer polyether block amides (for example, PEBAX® polyether block amides, sold by Arkema, Inc.).

In preferred embodiments, nanofiber film 14 has a melting temperature of at least 180 degrees C. In more preferred embodiments, nanofiber film 14 has a melting temperature of at least 200 degrees C.

In some embodiments, an oleophobic treatment is applied to nanofiber film 14. Oleophobic properties of nanofiber film 14 have been found to enhance the dust-release properties of the nanofibers. In one preferred embodiment, the oleophobic treatment includes treatment of nanofiber film 14 with a fluorine-containing plasma as disclosed in U.S. Pat. No. 6,419,871, the entire contents of which are hereby incorporated by reference in their entirety. In other embodiments, a melt-processable oleophobic compound (e.g., a fluorochemical) may be incorporated into the polymer composition used to form nanofiber film 14. In still other embodiments, an oleophobic compound may be introduced to the nanofiber film 14 after formation by deposition from a solvent carrier and subsequent removal of the solvent.

Fabric layers 12, 16 may be formed from a woven, non-woven, or knit fabric. Preferred materials are natural or synthetic materials that are flame retardant, non-melting, non-drip materials. Suitable materials include flame retardant polymers like m-aramid, Oxidized Polyacrylonitrile (OPAN), liquid crystal thermoplastic polymers, PTFE, flame retardant polyesters. In other embodiments, natural fibers such as cotton may be used, preferably in combination with a flame-retardant treatment.

At least one fabric layer, shown as fabric layer 12, is applied to a face 18 of nanofiber film 14. In some embodiments, a second fiber layer 16 may be applied to opposed face 20 of nanofiber layer 14. In one embodiment, nanofiber film 14 and fabric layers 12, 16 are laminated together using a gravure roll printing of a hot-melt adhesive at faces 18, 20 of nanofiber film 14.

In some embodiments, one or both fabric layers 12, 16 may include a hydrophilic treatment to increase wicking of moisture away from the skin of the wearer. In some embodiments, first fabric layer may include a hydrophilic treatment, while the opposed second fabric layer may include a hydrophobic treatment to resist absorption of moisture from the environment. In such a configuration, garments including the laminate 10 would be configured with first fabric layer 12 positioned on the inside of the garment and proximate to the wearer, while the second fabric layer would be positioned on the outside of the garment and distal to the wearer.

Additionally, one or more of layers 12, 14, and 16 may include an anti-static treatment or finish. In some embodiments, one or more layers 12, 14, and 16 may include anti-static carbon fibers or a carbon treatment. In other embodiments, one or more layers 12, 14, and 16 may include an anti-static chemical treatment.

A desired property of laminate 10 is that the laminate may be reversibly or recoverably stretched during wear and use. In a preferred embodiment, laminate 10 is reversibly stretchable by at least ten percent as compared to a relaxed dimension (e.g., length or width) of the laminate. In a more preferred embodiment, laminate 10 is reversibly stretchable by at least thirty percent. This stretching occurs without undoing other properties or features of the fabric and nanofiber layer 14 as described herein.

As used herein, "reversibly stretchable" refers to the ability of a material (i.e., a fabric layer, a nanofiber film, or a laminated material) to be elastically stretched in a direction in the plane of the material to a length greater than the relaxed (i.e., unstretched) state, without suffering permanent deformation or damage (e.g., plastic deformation, tearing, or fracture). Thus, the material will naturally return to its unstretched dimensions when the stretching force is removed, without altering the properties of the material (i.e., air permeability, filtration efficiency, MVTR, etc.). In the case of multi-layered materials such as laminated material 10, reversible stretching requires that the individual layers of the multi-layer material do not suffer damage or deformation, and further that the multi-layer material also remains intact, that is, with no delamination, separation, or damage to the bond between individual layers.

The multi-layer laminate described herein preferably has a Moisture Vapor Transmission Rating (MVTR) of at least 15,000 $g/m^2/day$, as measured by ISO 15496 (inverted cup method). In more preferred embodiments, the multi-layer laminate has a MVTR of at least 20,000 $g/m^2/day$ or more. Typically, the MVTR of laminate 10 is limited by the MVTR of nanofiber film 14.

Figure 3:
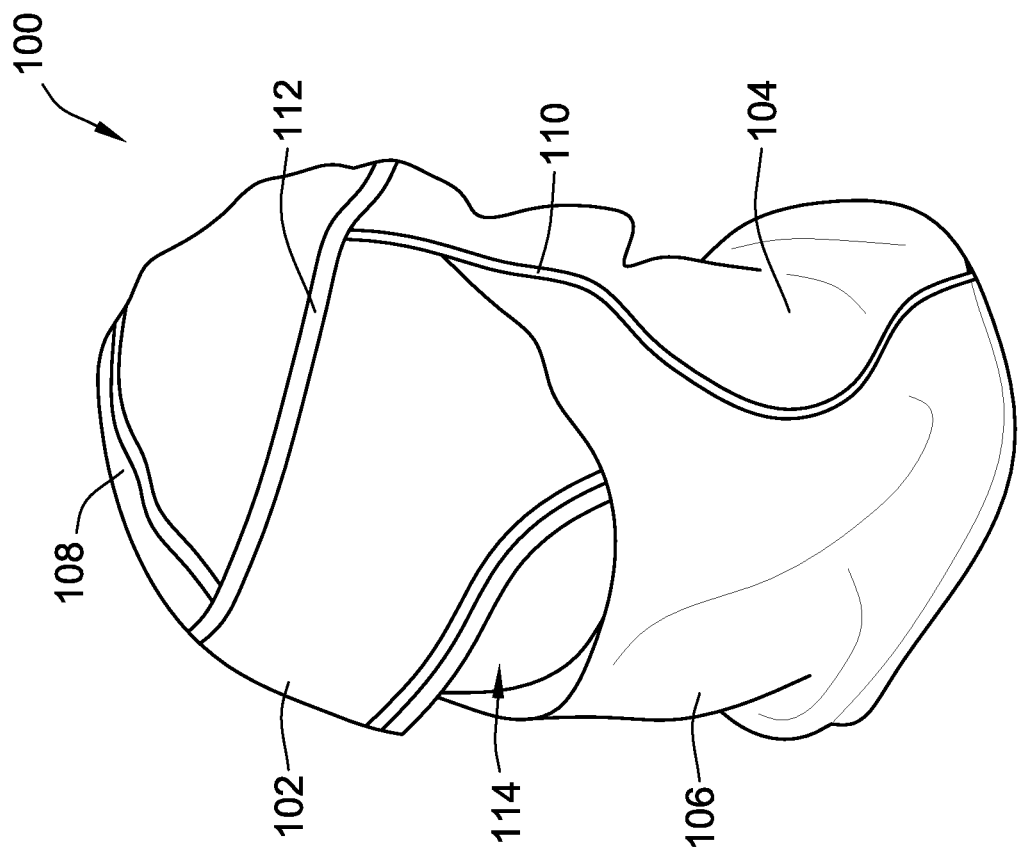
FIG. 3 is a perspective view of the protective hood shown in FIG. 2.
Figure 2:
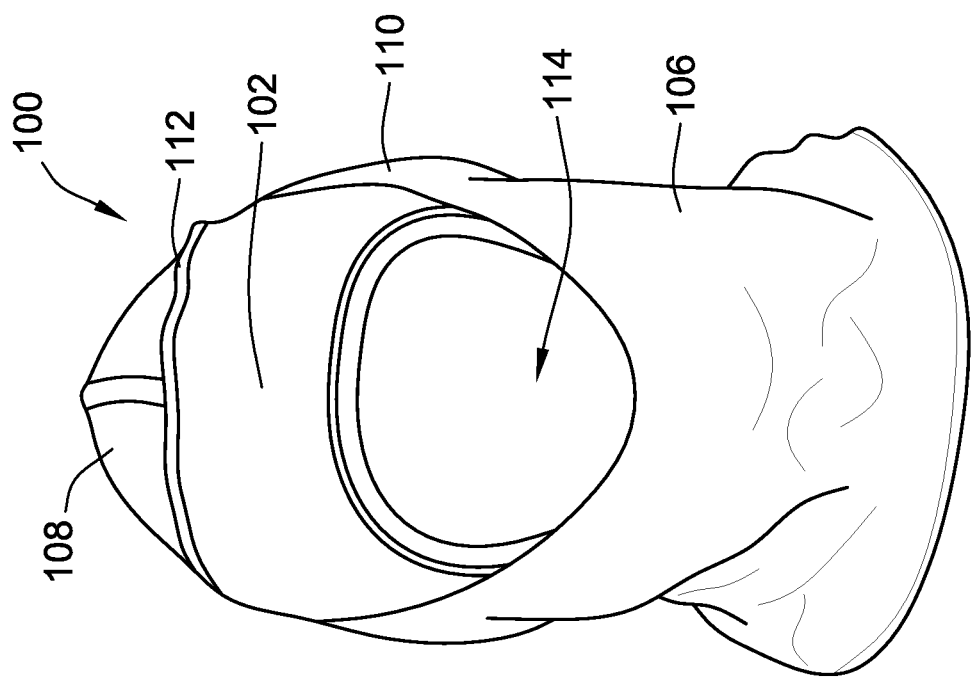
FIG. 2 is a front view of an embodiment of a protective hood incorporating the multi-layer laminate of the present invention.

Referring to FIGS. 2 and 3, an exemplary embodiment of a protective hood 100 is shown. Protective hood 100 is configured to be worn on the head of a user. In this embodiment, hood 100 includes front panel 102, rear panel 104, facial panel 106, and cap portion 108. As will be appreciated by those of skill in the art, a protective hood 100 may be assembled in numerous specific arrangements and configurations.

As shown, front panel 102 and rear panel 104 are joined at seam 110. Additionally, facial panel 106 and rear panel 104 are joined at seam 110. Cap portion 108 is joined to front panel 102 and rear panel 104 at seam 112. In a preferred embodiment, facial panel 106 and rear panel 104 extend downward to further cover the neck of the wearer, thereby minimizing exposed skin of the wearer. The garment is configured to cover at least 80 percent of the skin of user's head and neck area when worn. In typical embodiments, panels 102, 104, 106, and 108 are joined at seams 110 and 112 by sewing. In other embodiments, panels may be joined by an adhesive, melting, or any other process, as is generally known in the clothing arts.

Front panel 102 and facial panel 106 partially overlap proximate to seam 110, and define a user-adjustable facial opening 114. Facial covering portion 106 may be selectively adjusted to cover the nose and mouth of the user, the mouth of the user, or neither the nose or mouth out the user, as desired, while leaving the wearer's eyes uncovered. In hazardous environments, facial panel 106 may be worn over the nose and mouth of the user such that inhalation by the user causes inhaled air to be filtered through facial panel 106 before entering the user's lungs.

In some embodiments, only facial panel 106 is formed from the laminate material 10 of the present invention. Optionally, only a portion of facial panel 106 may be formed from laminate material 10, that is, the area of facial panel 106 proximate to the wearer's mouth and nose. In other embodiments, some or all of front panel 102, rear panel 104, and cap portion 108 may be formed from laminate material 10. In some embodiments, cap portion 108 is formed from a breathable mesh.

In a preferred embodiment, protective hood 100 weighs less than 6 ounces. In a more preferred embodiment, hood 100 weighs between about 2 to 4 ounces.

In various other embodiments, laminated material 10 may be incorporated into numerous other types of protective garments that can provide filtered air to a wearer. For example, a scarf may be provided. In one exemplary embodiment, a scarf is a strip of laminated material between about 3 to 6 feet in length, and having a width of about four to twelve or more inches. In the event a wearer perceives a need for air filtration, the scarf may be wrapped around the wearer's head to cover the mouth and nose of the wearer. In another exemplary embodiment, a shirt may be provided with an extendable turtle neck portion formed from laminated material 10. In the event a wearer perceives a need for air filtration, the turtle neck portion may be extended upwards to cover the mouth and nose of the wearer.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-layer laminate configured for forming a fabric filter for use in providing air filtration to a user's respiratory system, the multi-layer laminate comprising:
   a nanofiber filtration layer having a first side and a second side, wherein the nanofiber filtration layer has a basis weight of greater than 5 grams per $m^2$, wherein the nanofiber filtration layer comprises fibers having a median diameter of greater than 350 nm, wherein the nanofiber filtration layer has a particle removal efficiency of at least 75% for particles sized 0.3 microns and greater, an air permeability of at least 30 cfm and a Moisture Vapor Transmission (MVTR) of at least 20,000 $g/m^2/day$; and
   at least a first fabric layer,
   and wherein the at least a first fabric layer is laminated to the first side of the nanofiber filtration layer for forming a fabric filter for use in providing air filtration to a user's respiratory system.

2. The multi-layer laminate of claim 1, further comprising a second fabric layer, wherein the second fabric layer is laminated to the second side of the nanofiber filtration layer.

3. The multi-layer laminate of claim 1, wherein the nanofiber filtration layer has a basis weight of between 5 to 50 grams per $m^2$.

4. The multi-layer laminate of claim 1, wherein the nanofiber filtration layer has a basis weight between 15 to 30 grams per $m^2$.

5. The multi-layer laminate of claim 1, wherein the nanofiber filtration layer is between 2 mm to 50 mm in thickness.

6. The multi-layer laminate of claim 1, wherein the nanofiber filtration layer comprises fibers having a diameter of between greater than 350 nm to about 1200 nm.

7. The multi-layer laminate of claim 1, wherein the nanofiber filtration layer comprises fibers having a diameter of between 500 nm to 1000 nm.

8. The multi-layer laminate of claim 1, wherein the nanofiber filtration layer has a particle removal efficiency of at least 75% for particles sized 0.3 micron and greater.

9. The multi-layer laminate of claim 1, wherein the nanofiber filtration layer comprises a flame retardant, elastomeric polymer, wherein the flame retardant, elastomeric polymer is selected from the group consisting of thermoplastic polyurethane (TPU) with a flame retardant additive; polyvinylidene difluoride (PVDF); nylon with a flame retardant additive; polytetrafluoroethylene (PTFE); and elastomeric block copolymers.

10. The multi-layer laminate of claim 1, wherein the laminate is reversibly stretchable by at least ten percent.

11. The multi-layer laminate of claim 7, wherein the laminate is reversibly stretchable by at least thirty percent.

12. The multi-layer laminate of claim 1, wherein the first fabric layer is selected from the group consisting of woven fabrics, non-woven fabrics, and knit fabrics.

13. The multi-layer laminate of claim 9, wherein the first fabric layer comprises a flame retardant material selected from the group consisting of m-aramid, oxidized polyacrylonitrile (OPAN), liquid crystal thermoplastic polymers, polytetrafluoroethylene (PTFE), flame retardant polyester, and flame-retardant treated cotton.

14. A garment configured to be worn on the head of a user, the garment comprising:
   a facial portion configured to cover the face of the user, wherein the facial portion comprises a fabric filter multi-layer laminate according to claim 1.

15. The garment of claim 14, wherein the garment is a stretchable protective hood configured to cover at least 80 percent of the skin of the user's head and neck area when worn.

16. An article of manufacture, configured to be worn over at least the mouth and nose of a user, the article of manufacture comprising:
   at least a facial portion configured to cover at least the mouth and nose of a user, wherein the at least a facial portion comprises a fabric filter multi-layer laminate according to claim 1.

17. The article of manufacture of claim 16, wherein said article of manufacture is a face mask.

18. The article of manufacture of claim 16, wherein the article of manufacture is a protective hood configured to cover at least 80 percent of the skin of a user's head and neck area when worn.

19. The multi-layer laminate of claim 1, wherein the nanofiber filtration layer comprises fibers having a diameter of between 400 nm and 600 nm.

20. The multi-layer laminate of claim 1, wherein the nanofiber filtration layer is previously fabricated prior to being laminated to at least said first fabric layer.

21. The stretchable fabric filter multi-layer laminate according to claim 1, wherein the nanofiber filtration layer is a centrifugally spun formed nanofiber filtration layer.

* * * * *